United States Patent [19]

Friedrich et al.

[11] Patent Number: 4,700,800
[45] Date of Patent: Oct. 20, 1987

[54] DRIVE SYSTEM FOR MOTOR VEHICLES

[75] Inventors: Karl Friedrich, Leibnitz; Heribert Lanzer, Gössendorf, both of Austria

[73] Assignee: Steyr-Daimler-Puch AG, Vienna, Austria

[21] Appl. No.: 12,735

[22] Filed: Feb. 9, 1987

[30] Foreign Application Priority Data

Feb. 11, 1986 [AT] Austria .................................. 331/86

[51] Int. Cl.⁴ ...................... F16H 37/08; B60K 17/34
[52] U.S. Cl. .................................. 180/249; 180/248; 74/701; 74/705
[58] Field of Search ....................... 180/248, 249, 250; 74/701, 705, 710, 710.5

[56] References Cited

U.S. PATENT DOCUMENTS

| 4,538,700 | 9/1985 | Suzuki | 180/249 |
| 4,589,304 | 5/1986 | Ashikawa et al. | 74/701 |
| 4,627,513 | 12/1986 | Tutzer | 180/249 |
| 4,645,029 | 2/1987 | Sasaki et al. | 180/249 |

FOREIGN PATENT DOCUMENTS

| 2425797 | 12/1975 | Fed. Rep. of Germany . |
| 3128959 | 4/1982 | Fed. Rep. of Germany . |
| 3116242 | 5/1982 | Fed. Rep. of Germany . |
| 3216203 | 11/1982 | Fed. Rep. of Germany . |
| 3223836 | 2/1983 | Fed. Rep. of Germany . |

Primary Examiner—John J. Love
Assistant Examiner—Donn McGiehan
Attorney, Agent, or Firm—Marmorek, Guttman & Rubenstein

[57] ABSTRACT

A drive system for motor vehicles having a motor which has an axis that is transverse to the direction of travel of the vehicle comprises either a manually operable change-speed transmission which is disposed substantially beside the motor, or an automatic change-speed transmission which is coaxial to the drive shafts of the front axle. The change-speed transmission is operatively connected to the front axle differential of the vehicle, optionally via idler gears, and is operatively connected by an angle drive to a shaft which leads to and is operatively connected to the rear axle. The front axle differential is driven in known manner by a planetary gear train which has three torque-transmitting members, one of which is restrained by a preferably controllable liquid friction coupling, one coupling half of which is held against rotation, and the front axle differential, the planetary gear train, the liquid friction coupling and the angle drive are combined in a subassembly, which in dependence on the kind of the change-speed transmission is driven by idler gears having different transmission ratios.

5 Claims, 2 Drawing Figures

DRIVE SYSTEM FOR MOTOR VEHICLES

BACKGROUND OF THE INVENTION

1. Field of the Invention

This invention relates to a drive system for motor vehicles having a motor which has an axis that is transverse to the direction of travel of the vehicle and either a manually operable change-speed transmission which is disposed substantially beside the motor, or an automatic change-speed transmission which is coaxial to the drive shafts of the front axle, wherein the change-speed transmission is operatively connected to the front axle differential of the vehicle, optionally via idler gears, and is operatively connected by an angle drive to a shaft which leads to and is operatively connected to the rear axle.

2. Description of the Prior Art

Such a drive system comprising a manually operable change-speed transmission disposed beside the motor is known, e.g., from Published German Application 32 16 203. To permit the rear axle to be driven at all times an interaxle differential is required, which is connected to both axles. That interaxle differential consists of a planetary gear train having three torque-transmitting members so that a fixed ratio is maintained between the torques for driving the front and rear axles and said interaxle differential must be restrainable so that the vehicle can be driven even when one wheel is spinning. Another known drive system (Published German Application No. 32 23 836) comprises an automatic change-speed transmission which is coaxial to the shaft for driving the front axle and does not require an interaxle differential connected to the front and rear axles but the shaft connected to the rear axle of the vehicle must be adapted to be disconnected so that the rear wheels will not always be driven. On the other hand the front axle differential is driven via a planetary gear train which has three torque-transmitting members, one of which is an internal gear that is held against rotation on the housing. That planetary gear train serves to drive the front axle differential at a fixed transmission ratio. None of the known drive system is so designed that the essential parts used to drive the front and rear axles can be the same regardless of the type and arrangement of the change-speed transmission.

SUMMARY OF THE INVENTION

It is an object of the invention to eliminate said disadvantages and to provide a drive system which is of the kind described first hereinbefore and which permits an all-wheel drive to be maintained without a need for an interaxle differential and which can be used virtually in the same form with a manually operable change-speed transmission and with an automatic change-speed transmission.

That object is accomplished in accordance with the invention in that the front axle differential is driven in known manner by a planetary gear train which has three torque-transmitting members, one of which is restrained by a preferably controllable liquid friction coupling, one coupling half of which is held against rotation, and the front axle differential, the planetary gear train, the liquid friction coupling and the angle drive are combined in a subassembly, which in dependence on the kind of the change-speed transmission is driven by idler gears having different transmission ratios.

Because one torque-transmission member of the planetary gear train for driving the front axle differential is not held against rotation but is restrained by a liquid of the interaxle differential so that the all-wheel drive is maintained as desired. If the liquid friction coupling can be controlled, the ratio of the torques for driving the front and rear wheels can be varied. The provision of the liquid friction coupling having a coupling half which is held against rotation has the advantage that that liquid friction coupling can be controlled from the outside with simple means so that the characteristics of the liquid friction coupling can be changed in dependence on the desired operation. Because all essential parts are combined in a subassembly, a desirable modular arrangement is obtained and only the proper idler gears are required to be selected for adaptation to the different output speeds of a manually operable change-speed transmission and an automatic change-speed transmission. If the change-speed transmission is disposed beside the motor, it will be sufficient to provide the output shaft of said transmission with an extension carrying one of the idler gears so that the latter will be disposed adjacent to the above-mentioned subassembly and said subassembly may be arranged in the same position in which it will be arranged when a change-speed transmission of different type is used.

Within the scope of the invention a clutch is connected between the rotatable coupling half of the liquid friction coupling and that torque-transmitting member of the planetary gear train which is connected to said rotatable coupling half. That clutch will permit the drive of the front wheel to be interrupted in known manner, e.g., in order to avoid undesired influences on the behavior of the vehicle on the road (braking with wheel lockup).

DETAILED DESCRIPTION OF THE PREFERRED EMBODIMENT

Figure 1:
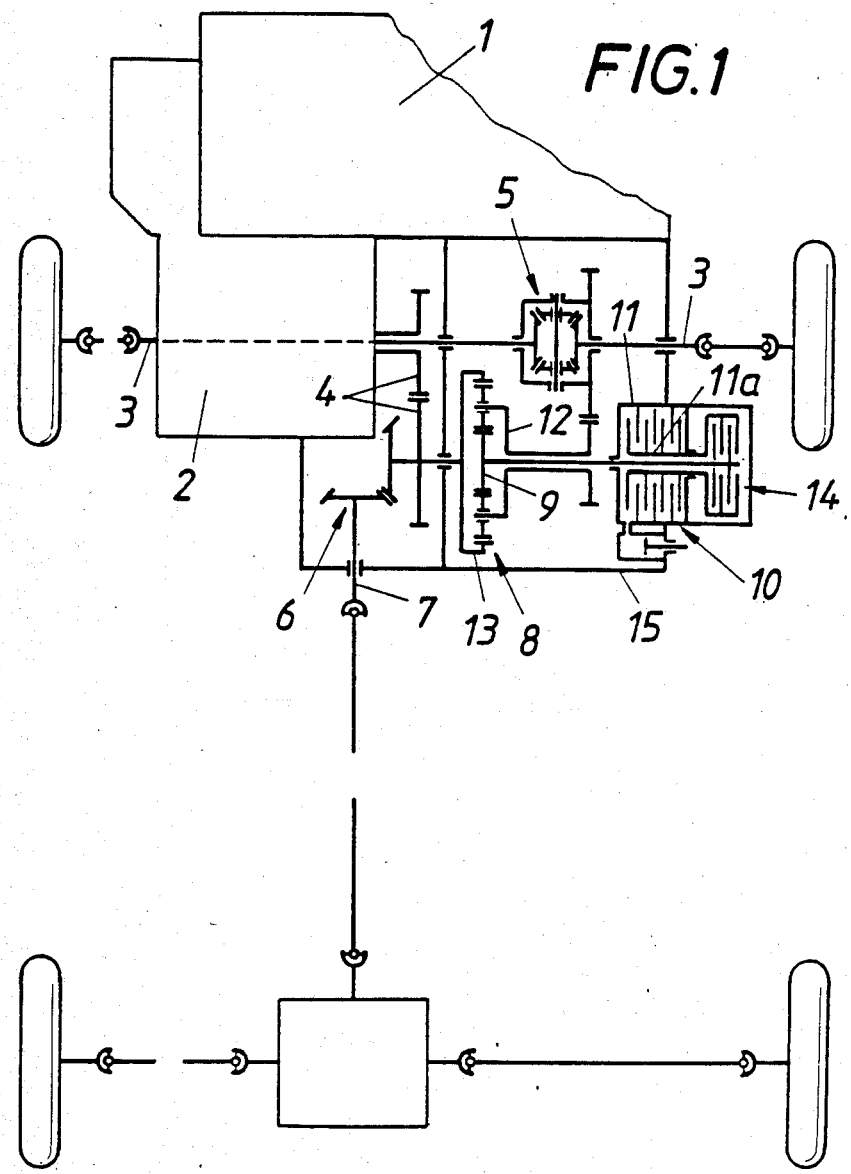
FIG. 1 is a diagrammatic representation showing a drive system comprising an automatic change-speed transmission disposed behind the motor.

Two illustrative embodiments of the invention will now be described more in detail with reference to the drawing.

In the embodiment shown in FIG. 1, the motor 1 has an axis which is transverse to the direction of travel of the vehicle. Said motor is succeeded by an automatic change-speed transmission 2, the main parts of which are disposed behind the motor 1 with respect to the direction of travel and are coaxial to the drive shafts 3 of the front axle. The change-speed transmission 2 drives via detachably mounted idler gears 4 the front axle differential 5 and via an angle drive 6 drives a rear axle drive shaft 7, which extends to and is operatively connected to the rear axle. The front axle differential 5 is driven by a planetary gear train 8, which has three torque-transmitting members, namely a first member or internal gear 13, which is driven by the idler gears 4, a second member or planet carrier 12 for driving the differential 5, and a third member or sun gear 9, which is restrained by a controllable liquid friction coupling 10, one coupling half of which consists of a housing 11, which is held against rotation. The driving gear of the angle drive 6 is mounted on the shaft carrying driven idler gear 4 and the internal gear 13.

A multiple-disc clutch 14 is connected between the rotatable coupling half 11a of the liquid friction coupling 10 and the sun gear 9 of the planetary gear train 8 and permits the liquid friction coupling 10 to be entirely disabled. The differential 5, the planetary gear train 8, the liquid friction coupling 10, the multiple disc clutch 14 and the angle drive 6 are substantially accommodated in a common housing 15 to constitute a subassembly.

Figure 2:
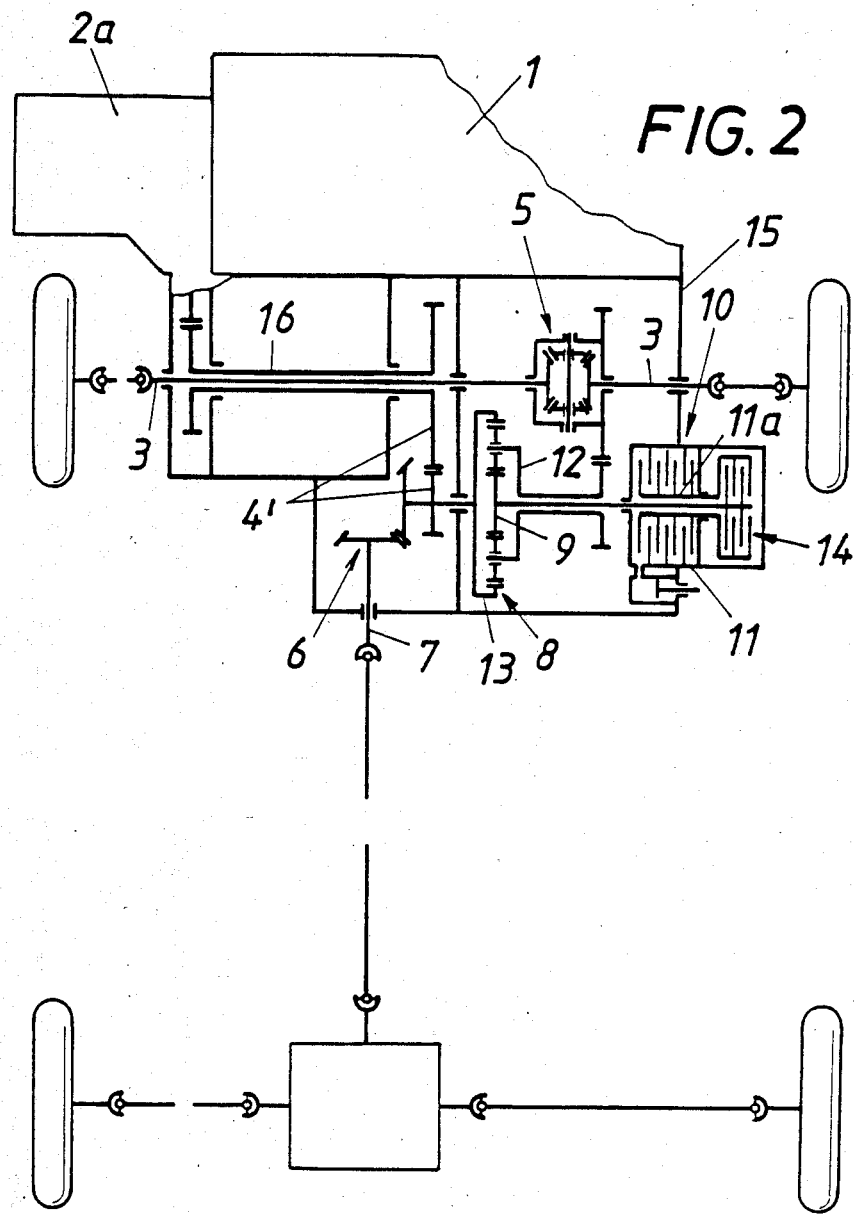
FIG. 2 is a diagrammatic representation showing a drive system comprising a manually operable change-speed transmission disposed beside the motor.

FIG. 2 shows an arrangement comprising a manually operable change-speed transmission 2a, which is disposed beside the motor 1 and is operatively connected to the same subassembly as shown in FIG. 1 by detachably mounted idler gears 4' having a transmission ratio which differs from that of the idler gears 4. The lateral distance between the output member of the change-speed transmission 2a and the idler gear 4' mounted on the same shaft as the internal gear 13 of the planetary gear train 8 and the input member of the angle drive 6 is spanned by a shaft extension 16.

We claim:

1. In a drive system for use in a motor vehicle having a direction of travel and having an axis which is transverse to said direction of travel, a change-speed transmission adapted to be driven by said motor and having an output member adapted to be nonrotatably connected to a first idler gear, two front axle drive shafts which are transverse to said direction of travel, a rear axle assembly extending transversely to said direction of travel, a rear axle drive shaft extending in said direction of travel and coupled to said rear axle assembly to drive the latter, said drive system comprising, a front axle differential adapted to be coupled to said output member and coupled to said front axle drive shafts to drive the latter, an angle drive adapted to be coupled to said rear axle drive shaft to drive the latter, the improvement residing in that said drive system comprises:

a planetary gear train comprising first, second and third torque-transmitting members, a detachably mounted second idler gear adapted to mesh with said first idler gear and operatively connected to said angle drive to drive the latter, and a liquid friction coupling having a first coupling half which is held against rotation and a rotatable second coupling half coupled to said third torque-transmitting member, wherein said first torque-transmitting member is operatively connected to said second idler gear, said second torque-transmitting member is operatively connected to said front axle differential, and said differential, planetary gear train, liquid friction coupling, and angle drive constitute a subassembly.

2. The improvement set forth in claim 1, wherein said liquid friction coupling is controllable.

3. The improvement set forth in claim 1 for use in a motor vehicle in which said change-speed transmission is manually operable and disposed substantially beside the motor with respect to said direction of travel.

4. The improvement set forth in claim 1 for use in a motor vehicle in which said change-speed transmission is automatic and is substantially coaxial to said front axle drive shafts.

5. The improvement set forth in claim 1, wherein a clutch is connected between said third torque-transmitting member and said rotatable coupling half.

* * * * *